United States Patent [19]

Artbauer et al.

[11] 3,996,414
[45] Dec. 7, 1976

[54] SPACER CONSTRUCTION FOR GAS INSULATED HIGH VOLTAGE CABLE

[75] Inventors: Jan Artbauer; Harald Roderburg; Friedrich Schatz, all of Langenhagen, Germany

[73] Assignee: Kabel-und Metallwerke Gutehoffnungshutte Aktiengesellschaft, Hannover, Germany

[22] Filed: July 26, 1973

[21] Appl. No.: 382,916

[30] Foreign Application Priority Data

July 27, 1972    Germany .......................... 2236854

[52] U.S. Cl. .............................. 174/28; 174/16 B; 174/111
[51] Int. Cl.² ......................................... H01B 9/04
[58] Field of Search ............... 174/28, 29, 16 B, 92, 174/111, 99 B, 155, 99 R; 138/112, 113, 114

[56] References Cited

UNITED STATES PATENTS

| 3,272,913 | 9/1966 | Crimmins et al. | 174/155 X |
|---|---|---|---|
| 3,306,793 | 2/1967 | Gill et al. | 174/99 R X |
| 3,391,243 | 7/1968 | Whitehead | 174/28 |
| 3,531,576 | 9/1970 | Hildebrand | 174/28 |
| 3,639,671 | 2/1972 | Clark | 174/16 B |
| 3,757,031 | 9/1973 | Izraeli | 174/92 X |
| 3,777,045 | 12/1973 | Artbauer | 174/28 |

FOREIGN PATENTS OR APPLICATIONS

| 879,077 | 2/1943 | France | 174/28 |
|---|---|---|---|
| 48,228 | 11/1937 | France | 174/28 |
| 632,937 | 6/1936 | Germany | 174/28 |
| 1,218,573 | 6/1966 | Germany | 174/28 |
| 826,940 | 1/1952 | Germany | 174/28 |
| 538,119 | 7/1941 | United Kingdom | 174/28 |
| 397,081 | 8/1933 | United Kingdom | 174/28 |

*Primary Examiner*—Arthur T. Grimley
*Attorney, Agent, or Firm*—Ralf H. Siegemund

[57] ABSTRACT

In a gas insulated high voltage cable having an outer tubular, corrugated conductor and an inner centrally disposed conductor, a spacer construction for holding and spacing the inner conductor in the tubular outer conductor, wherein each spacer has at least two spacer elements of semi annular construction each and complementing each other for establishing a closed annulus, each element constructed for laterial slipping onto the inner conductor, and the two spacer elements are secured to each other to establish the closed annulus in positive disposition on the inner conductor. Additional features impede local voltage breakdown, positive interlock of parts and resilient load relief.

14 Claims, 14 Drawing Figures

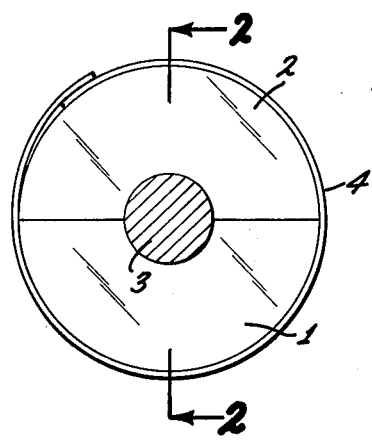
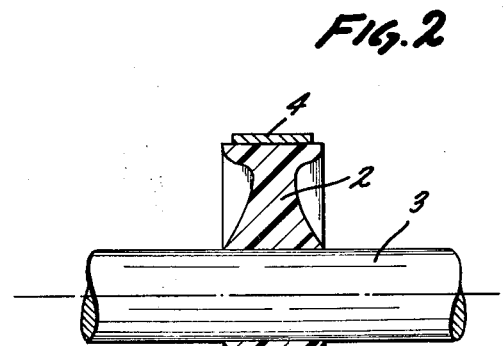
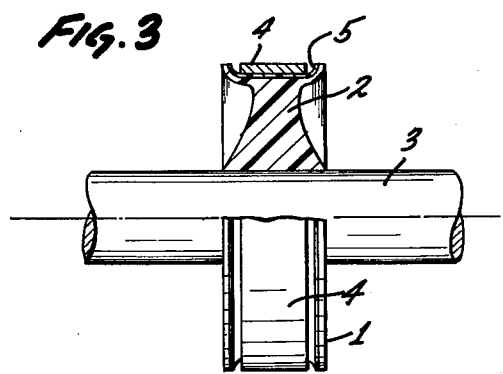
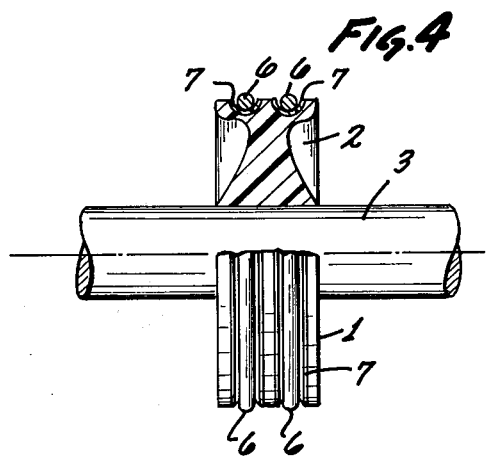
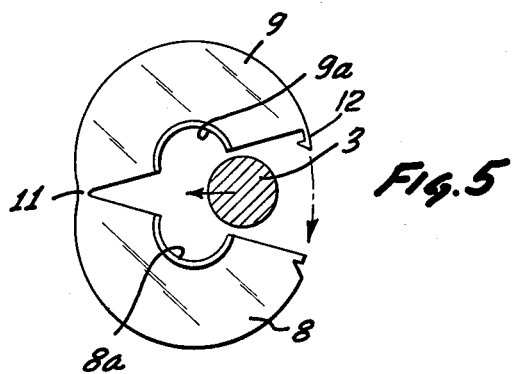
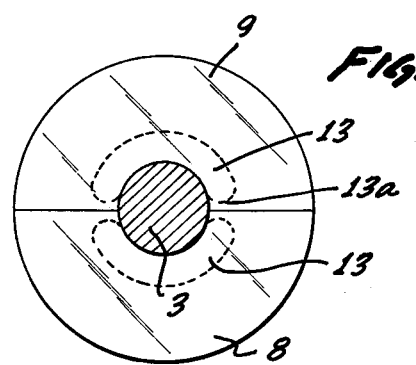
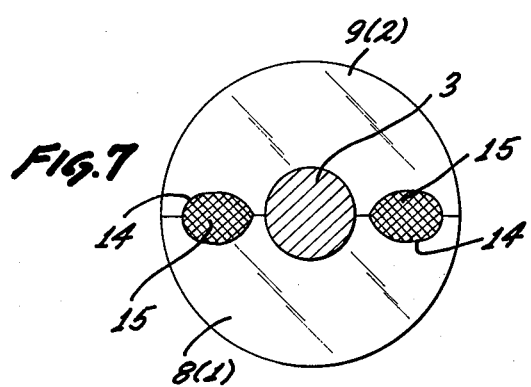

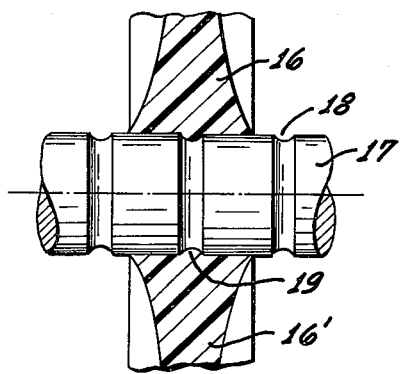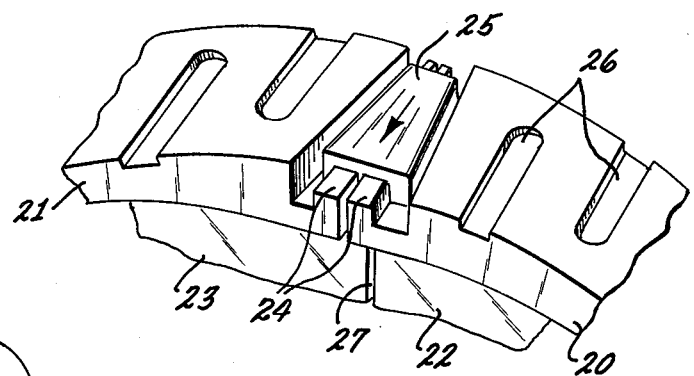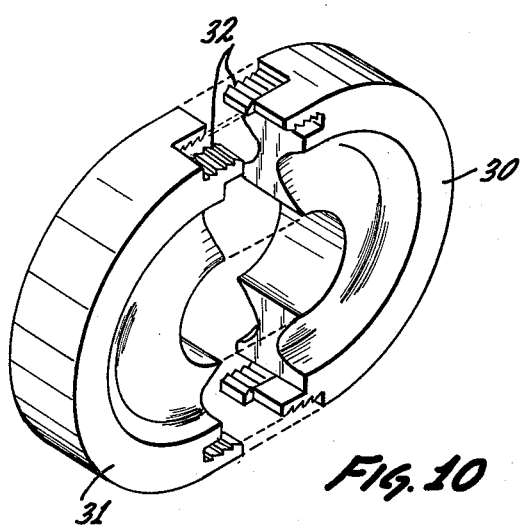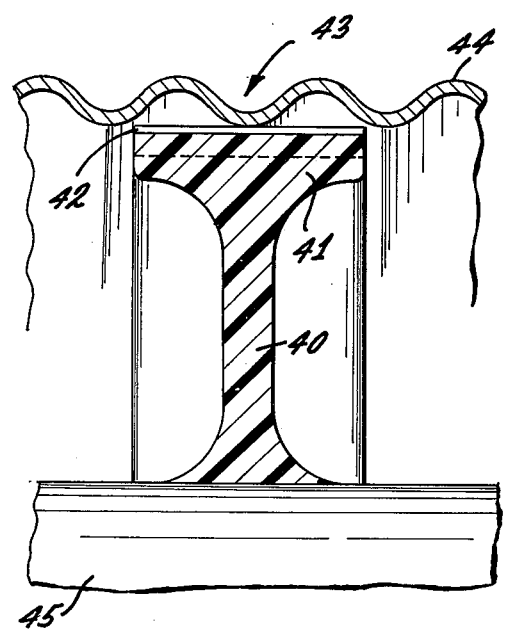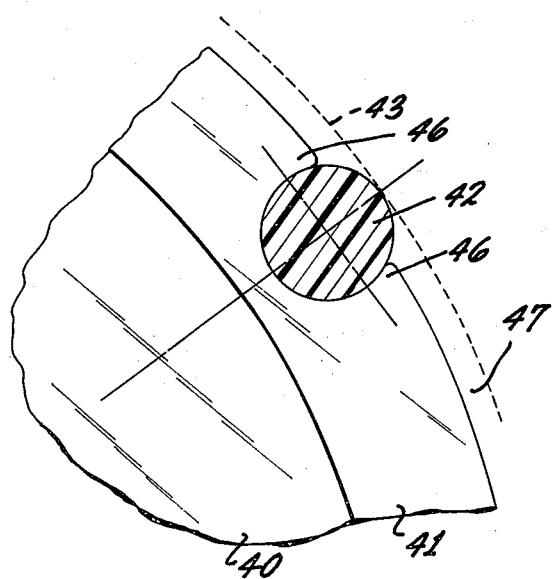

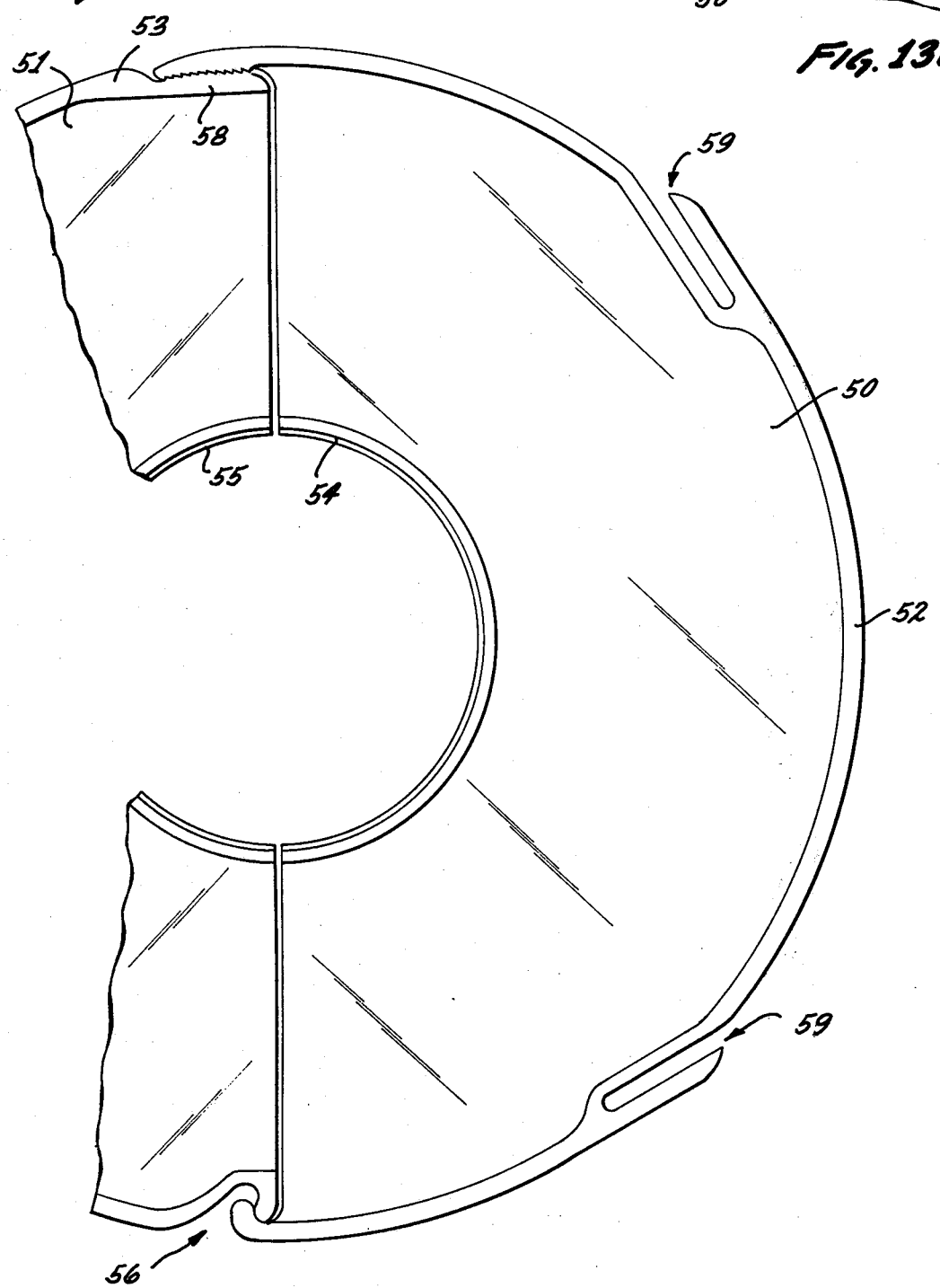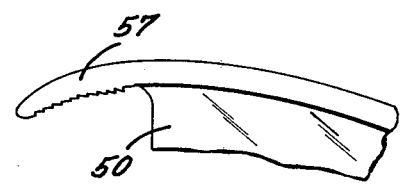

SPACER CONSTRUCTION FOR GAS INSULATED HIGH VOLTAGE CABLE

BACKGROUND OF THE INVENTION

The present invention relates to a spacer construction for gas insulated, high voltage cable, the cable including an outer corrugated tube and an inner conductor located centrally in the corrugated tube and held therein by means of spacers.

Gas insulated cables are known, having an outer, tubular envelope, and an inner conductor held therein by means of spacers. These cables come in lengths of e.g. a few meters. The spacers are usually disc shaped with a central opening for slipping such a disc onto the conductor and being secured thereto. The outer tube is then pushed on top of the proposed conductor-plus-spacer configuration. Long cables require in toto several hundreds of such spacers which render the entire manufacturing procedure quite cumbersome. Even spacers which are cast or extruded over the inner conductor are not too much of an improvement as far as ease of manufacturing is concerned.

High frequency cable when used as transmission lines for rather high power, and particularly when used for considerable length, are also constructed to have an inner conductor and a tubular, corrugated outer conductor, and spacers are included each of which having three similar, insulative support elements arranged regularly about the conductor and interconnected by a resilient, open loop wire. Since such a spacer does not have a closed annular configuration, it can be slipped laterally onto the conductor, one upon the other just ahead of folding a metal strip longitudinally about the inner conductor-plus-spacers to form the tubular outer conductor in a continuous process. The edges of the strip adjoin after the folding process and are welded together. The same procedure is hardly realizable for high voltage cable because of the metal holder for the spacer and support elements. Even if a suitable replacement could be found, upon arc developing for a voltage breakdown, spreading of the resulting decomposition products cannot be avoided. Consequently, a considerable length of such a cable will have to be replaced because damage must be expected to have spread extensively.

SUMMARY OF THE INVENTION

It is an object of the present invention to provide for a spacer construction for high voltage cable with gas insulation which permits placement of spacers onto a conductor during a continuous manufacturing process without slow down or interruption thereof.

It is another object of the present invention to provide a spacer construction for concentric cable construction which significantly impedes migration of decomposition products after a voltage break through.

It is, therefore, a specific object of the present invention to provide for a new and improved spacerconstruction by means of which a conductor can be supported centrally in a corrugated tube, serving as grounded return path conductor as well as enclosure for an insulation enhencing gas such as $SF_6$.

In accordance with the preferred embodiment of the present invention it is suggested to construct a spacer from at least two individual elements which together constitute a closed annulus and are provided with locking means effective transverse to the axis of the conductor upon placement thereon; upon locking the spacer is fixed onto that conductor.

Upon manufacturing such a cable, the conductor is continuously paid, and the spacer elements are laterally slipped onto the conductor, whereupon they are locked. The spacers are thus individually and sequentially placed onto and locked to the inner conductor, and the outer conductor is then formed about this conductor plus spacer configuration by longitudinally folding metal strip, welding the edges and corrugating the resulting tube. The spacers, more or less compartmentize the interior of the resulting tube and impede migration of decomposition products in the case of a voltage break through. The individual spacer elements are interconnected so that upon locking them to establish a complete and closed spacer annulus, they are fastened therewith to the conductor on which they have been seated. Fastening on the inner conductor is accomplished by means of friction and resilient interaction or by means of grooves and springs in the surfaces of the parts to be interconnected. Such fastening prevents axial displacement of the spacers, which is a necessary prerequisite for satisfactory manufacturing and subsequent use of the cable as a whole.

As stated, the spacer elements can be clamped onto the inner conductor, to be held e.g. frictionally thereon. Additional, resilient elastomeric or other plastic layers may aid in the engagement; also, interfacing surfaces may be roughened to enhance frictional engagement. The inner conductor may be provided with annular grooves or other corrugation, and the spacers may have matching contour so that they are axially position-arrested once seated on that inner conductor in engagement with the corrugation. For this, the inner conductor may be jacketed in a corrugated envelope, or sleeves are provided in places, where the spacers are to be positioned. One can see, that a combination of fastening features can be provided for.

The spacer elements can be tied together by means of ribbons or wires. They can be bonded or glued together (i.e. to each other) or welded e.g. by means of supersonic welding. In this case, one will provide particular ribs in adjacent surfaces of the spacer elements which interface so as to broaden the surface available for welding. They can be clamped together by snap locks or interconnected in wedgelocks or by means of interlocking serrations or jaws. One can also use clamping rings, or other auxiliary fastening and locking components. Utilization of wedge locks permit ready compensation of tolerances while clamping springs, rings or ribbon are rather accurately predetermined as far as tension and interacting forces is concerned.

The spacers are preferably constructed of electrically insulating material having also high temperature resistance and high mechanical strength. Also, they should have some elasticity. Polycarbonate, polysulfone or polyphenylene oxide are suitable here. The spacer surfaces adjacent to or in engagement with the conductors may be provided with elastic layers, etc. e.g. for compensating tolerances in the dimensions of the inner conductor and/or in outer tube. Also, forces exerted upon the spacer when the outer tube is corrugated must be taken up.

The elastic layers between the spacer elements and conductor surfaces can be combined with a certain conuctance to provide electric load relief. For example, such a layer along the outer periphery of the spacers prevent discharge particularly in the space between spacer and corrugated outer tube. Field distributing metal or metalized inserts in the spacer elements are disposed adjacent the inner conductor and being e.g. of kidney shaped configuration, to relieve the electric tension in the gap or joint between complementary spacer elements so as to reduce the tendancy of a local voltage break down e.g. due to excessive local field strength.

If the outer conductor is a helically corrugated tube, then the helical duct along the inner wall of the outer tube provides for gas passage throughout the cable. Such gas is a desirable feature for filling or refilling the cable with gas e.g. after a repair or after replacement of a section and splicing.

If the outer tube is annularly corrugated some gas passage should be provided through the spacers themselves, which may have special opening, ducts or channels perferable covered with cloth or other mesh for trapping dirt, dust or decomposition particles.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross-section through a conductor with a two part annular spacer shown in side elevation;

FIG. 2 is a section view along line 2—2 in FIG. 1;

FIGS. 3 and 4 are views similar to FIG. 2 but showing two modifications as to the periphery of the spacer;

FIG. 5 is another example of the preferred embodiment of the invention, in side elevation;

FIGS. 6 and 7 are side views of such spacers showing additional improvement features, FIG. 6 as to electrical tension relief, FIG. 7 as to gas flow;

FIG. 8 is a fragmentary view for a spacer portion, showing the preferred form of affixation to an inner conductor;

FIGS. 9 and 10 are perspective views of two preferred and different constructions for locking the two parts of a spacer;

FIG. 11 is a cross-section through a spacer with additional compression relief;

FIG. 12 is a fragmentary view through the construction of a FIG. 11 taken in a transverse plane; and FIGS. 13 and 13a are respectively side elevation and detail of a preferred spacer construction in occordance with the present invention.

Proceeding now to the detailed description of the drawings, FIGS. 1 and 2 illustrates a conductor core 3 to be enveloped by an outer tube and to be supported therein. The core 3 carries a spacer made of two segments 1 and 2 which together constitute a closed annulus. The two parts 1 and 2 can be laterally slipped onto the core, in radial direction. After having been seated on conductor 3, the two segments are looped by a ribbon 4 which has one end fastened to the other end for holding the now completed annular spacer on the conductor. The ribbon ends may, for example, be clamped, squeezed or crimped together. The elements 1 and 2 are made of — for example, polycarbonate, polyphenylene oxide (PPO) or polysulfone.

As shown in greater detail in FIG. 1, the spacer elements have radially decreasing cross-section but ending in a broad annular head with a cylindrical surface for engaging ribbon 4. The spacer elements have also a (axially) relatively wide foot portion for engagement with the conductor 3. The axial dimensions of the spacer elements as radially diminishing prevent formation of local weak spots in the insulation as affected by the distribution of the electric field.

FIG. 3 illustrates two modifications. The peripheries of parts 1 and 2 are contoured to establish a shallow trough in which to place ribbon 4. Additionally, the bottom of that trough is lined with an electrically conductive layer 5 such as a lacquer or a plastic having a conductive additive. This layer prevents local arc discharges which may be caused by the presence of the ribbon (or by a wire provided for the same purpose) as disturbing locally the electric field. The layer 5 may have also some elasticity i.e., it may include elastomeric material or the like to provide for additional elasticity between the annular spacer head and the outer tube interfacing with the spacer head via the ribbon. This way some tolerances can be compensated or forces exerted through the outer tube onto a spacer are more readily taken up. Also, such elasticity provides for positive engagement between spacer (e.g. through the ribbon) and the outer tube to prevent the formation of small local gaps.

The utilization of fastening wire is shown in FIG. 4. The two spacer elements 1 and 2 are provided with peripheral grooves, which complement each other in the two parts to establish e.g. two annular grooves when the parts 1 and 2 are placed in annulus completing disposition. Wires 6 are received in these grooves to tie the parts 1 and 2 together. Each groove is provided with a conductive layer 7, which may also have some resiliency.

The two spacer elements 1 and 2 of FIGS. 1 through 4 are individual but complementary elements, and are tied together by a ribbon or by wires as described to establish an assembled annulus. FIG. 5 illustrates two parts 8 and 9 which are actually integral due to a hinge 11. Since parts 8 and 9 are made of plastic as described, the formation of a flexible and resilient portion 11 to serve as hinge presents no problems. The two parts 8 and 9 are normally held in a closed annulus configuration but can be folded or spread apart for insertion of conductor 3. Upon folding back a snap lock 12 engages and locks the two parts 8 and 9 which cannot be spread apart again except through manipulation of the lock, and therefore, the spacer is positively seated on conductor 3.

In lieu of tying or snapaction closing or in addition therefore, the spacer elements may be bonded, glued or welded together by means of ultrasonic welding.

The individual parts of the spacer as interconnected to establish a closed annulus, should be forced against the conductor 3 with such a force that the friction suffices to prevent axial displacement. This effect can be reinforced by lining the spacer parts where interfacing with the conductor with an elastic layer such as 8a, 9a or by roughening the respective cylindrical spacer surface. An elastic layer could also be extruded onto the conductor 3 while the semicylindrical surfaces of the spacer elements interfacing with the conductor are provided with grooves, ribs, etc. Instead of the integral snap lock of FIG. 5, (or of a looping tape on FIGS. 1 to 3) one could use a clamping ring, ring clip or the like. FIG. 4 could be interpreted in that manner. The parts 1 and 2, or 8 and 9, may be dimensioned so that upon loosely seating them onto conductor 3 a (radial) gap remains between these parts. Only upon clamping the parts together (or tying them, etc) will the gap be narrowed to a joint of zero gap width, and the spacer elements now positively engage the conductor inbetween and in a frictional, clamping disposition.

The example of FIG. 5 as well as the example of the earlier figures show clearly, that any gap or joint as between the complementary spacer elements runs transverse to the surface of the respective conductor. Such a joint however may still pose some problems as to local voltage breakdown.

FIG. 6 shows similar gap extensions and can be construed as spacer construction of any of the types as described. However, this figure shows additional features for providing some relief as far as the electric field is concerned and as it acts on and in the vicinity of the spacer, particularly near or in the joint between the spacer elements.

The two elements 8 and 9 (or 1 and 2) in FIG. 6 are provided with electrically conductive, kidney shaped inserts 13 placed in the vicinity of the conductor 3. These inserts are either made of metal or of metalized plastic. These inserts remain separated in the two parts and have aximuthally extending convex curves such as 13a facing the joint between the spacer parts and thus controlling the field distribution thereof for reducing local field strength, thereby reducing the danger of local voltage breakdown. This feature, in combination with an electrically conductive lining along the head periphery of the spacer, is very effective indeed for reducing the danger of voltage breakdown anywhere in the cable.

FIG. 7 illustrates that complete compartmentizing of the cable may not always be necessary or desirable. Therefore, the parts 8 and 9 (or 1 and 2) are provided with recesses which together define openings 14. These windows or passages permit more readily insulation-enhancing gas to pass through. However, the openings are covered with some mesh, grid, cloth, fleece, paper, net, cloth or fabric inserts 15 acting as filter to stop migration of decomposition particles, dust or dirt. This window cover 15 should be made of plastic fibers. The covered windows 14 shall permit gas flow throughout the length of the cable.

Thus far, the examples have been described with reference to a simple mode of fastening the spacer parts to the connector, merely by seating them thereon. The respective recesses of the spacer parts may have similar or slightly smaller diameter so that each spacer element can be clamped on the conductor. In these instances conductor 3 has more or less smooth surface configuration as in the case of stranded wires the surface contour is more or less smooth in axial direction so that clamping in one form or another is desirable for sealing the spacers on the conductor and holding them thereon. Rubber or the like linings and/or surface roughening enhances frictional engagement between spacer parts and conductor(s).

FIG. 8 shows an inner conductor 17 with corrugation grooves 18. These annular grooves in the conductor permit another advantageous mode of affixing the spacers to the conductor. The spacer elements 16, 16' are provided with annular protrusions 19 for engaging a groove 18. The tube 17 may be constructed as a jacket, or as sleeve or sleeves enveloping e.g. stranded conductor wires or a portion thereof and filling the jacket. Generally speaking, this example stands for the feature of providing unevenness in the spacer parts — conductor interfaces providing some positive locking action as to axial displacement. The spacer elements as peripherally held together clearly provide for the radially inwardly directed force necessary to keep the spacer elements on the conductor so that the axial lock or stops can be effective.

The conguation here is shown in form of pronounced grooves in the conductor tube, and ridges extend from the spacer elements. The relation, however, could be a reversed one as far as ridges and grooves are concerned.

In the previous examples rather simple modes of holding the complementary spacer parts together have been described. Ribbon or wire can be used to tie the parts together or an integral snap action lock can be employed (FIG. 5). FIG. 9 shows another way of fastening these spacer parts, here designated by 22 and 23, together.

Parts 22 and 23 each have a peripheral head, 20 and 21 respectively and the adjoining azimuthal end portions have wedge configuration, 24. Together these two wedges 24 form a common wedge over which can be slipped a clamp 25. Upon placing the clamp 25 in position and in direction of the arrow the two parts 22 and 23 are releasably interconnected. A similar connection can be provided for at the other i.e. the diametrally opposite side. Alternatively, a hinge such as 11 can be provided thereat. This particular connection permits control of the width of the residual gap 27 to thereby adjust the effective diameter of the opening which receives the conductor. This way, tolerances can be compensated and clamping action of the spacer parts on the conductors can be adjusted and controlled.

FIG. 9 shows additionally a particular construction of the spacer heads, here 20 and 21. The periphery of these heads is provided with axially extending grooves 26, which do not run all the way through the axial width of the head but begin alternatingly from opposite axial sides. Since the outer conductor tube in which the spacer is inserted is usually corrugated, the heads 20, 21 will abut an inwardly directed corrugation crest, but the grooves 26 pass underneath such crest and provide for limited gas passage. However, it was found that such grooves 26 provide for turbulence in the gas flow so that actually any decomposition products after a voltage breakdown will not migrate far. Nevertheless pressure equalizing through-connection for gas is still provided for.

FIG. 10 shows a modified lock for two complementary spacer parts 30 and 31, which together establish an annulus circumscribing a conductor after having been individually and laterally spaced thereon. The parts have sawtooth like serrations rib or jaws 32 in mating complementary fashion, interlockingly engaging after having been pushed onto and over each other. One can see from the drawing that the lock cannot disengage axially as once snapped-in the two parts cannot axially be displaced relative to each other.

As stated above, the layer underneath a ribbon or the like was not only metallized but also highly elastic. Similar layers could be provided also in the inface between spacer elements and conductor (see FIG. 5). This way some resiliency is provided for in radial direction. Additionally the spacers have some resiliency itself. Resiliency of a spacer element is beneficial particularly when the outer conductor tube is formed about the inner conductor when already carrying the spacers. The metal strip is longitudinally folded about the conductor plush spacer configuration and the resulting tube is longitudinally welded along the now adjoining strip edges, subsequently this tube is corrugated in that eventually radially inwardly directed pressure is applied upon the tube which is transmitted in cases upon the spacer underneath. The resiliency thereof is beneficial to take up that force.

FIGS. 11 and 12 show that additional inserts 42 in the head 41 of a spacer element will aid further in taking up forces when corrugation grooves 43 are formed in the outer conductor tube 44 such groove being effective as ridge on the inside of the tube. The inner conductor is denoted 45 in this example. THe resilient elements may be made of material or synthetic rubber such as neopren or of a plastic on urethane basis. These elements are inserted in grooves in the head 41 of spacer element 40. The grooves are undercut at 46 so that a resilient support element 42 is held therein once having been squeezed into the groove in head 41. The gap 47 between the remainder of the head and the crestline or ridge of corrugation 43 serves as narrow passage for gas.

FIGS. 13 and 13a illustrates another example of two interconnected spacer parts 50 and 51, respectively with head annulus 52, 53 and widened foot 54, 55. One end each of the head portion of the two parts is constructed as two engaging parts to provide for a hinge 56. The top shows two interlocking serrations, ribs or jaws 57, 58 one reaching over the other for fastening the two hinged spacer elements 50, 51. Additionally the Figures show a contour deformation of the head of element 50 to establish e.g. two tongues 59 which extend tangentially to the peripheral surface of the head and will resiliently interact radially with the outer tube when in engagement therewith and, particularly when the outer tube is formed thereon and is being corrugated.

The invention is not limited to the embodiments described above but all changes and modofications thereof not constituting departures from the spirit and scope of the invention are intended to be included.

We claim:

1. In a gas insulated high voltage cable having an outer tubular, corrugated conductor and an inner centrally disposed conductor, a spacer construction for holding and spacing the inner conductor in the tubular outer conductor, comprising:
   two spacer elements of semi-annular construction each and complementing each other for establishing a closed annulus, each element constructed for lateral slipping onto the inner conductor; a plurality of tangentially extending tongues on the outer periphery of the annulus undergoing radial deflection upon engagement with the outer conductor and resiliently bearing thereagainst; and
   means for securing the spacer elements to each other to establish the closed annulus in positive disposition on the inner conductor.

2. In a gas insulated high voltage cable having an outer tubular, corrugated conductor and an inner centrally disposed conductor, a spacer construction for holding and spacing the inner conductor in the tubular outer conductor, comprising:
   two spacer elements of semi annular construction, each with azimuthally directed end faces and complementing each other for establishing a closed annulus when the end faces are placed in abutment, each element having a foot portion for engagement with the inner conductor and a head portion for engagement with the outer conductor;
   releasable, interengaging hinge parts respectively at one end face for hinging the two spacer elements together respectively at that one end of the head portions in that one of the hinge part pivots in the respective other one; and
   means for releasably securing the head portions of the elements to each other at the respective other ends, thereby positively seating the two elements together on the inner conductor and in positive engagement therewith.

3. A spacer construction as in claim 2 the means for securing including interlocking parts on the elements for holding the elements together.

4. A spacer construction as in claim 3, the interlocking parts including sawtooth-shaped, axial ribs.

5. A spacer construction as in claim 2, the annulus having at least one axial opening, there being filter means in the opening permitting passage of the gas but stopping solid particles.

6. A spacer construction as in claim 2, the inner conductor having grooves and/or ridges, the elements having mating and/or grooves for engagement with the inner conductor to prevent axial displacement of the annulus.

7. In a cable as in claim 2, the head portions being provided with resilient tongues, extending tangentially from the head portions and being radially deflected upon engagement with the outer conductor and resiliently bearing thereagainst.

8. In a gas insulated high voltage cable having an outer tubular, corrugated conductor and an inner centrally disposed conductor, a spacer construction for holding and spacing the inner conductor in the tubular outer conductor, comprising:
   two spacer elements of semi-annular construction, each with azimuthally directed end faces and complementing each other for establishing a closed annulus when the end faces are placed in abutment, each element having a foot portion for engagement with the inner conductor and a head portion for engagement with the outer conductor, the head portion having an annular surface for engagement with an inwardly directed ridge of the corrugation in the outer conductor, there being a plurality of axially oriented grooves in the surface extending therein for less than the axial width of the head portion, but permitting gas to flow around the corrugation ridge from one side of the annulus to the other; and
   means for securing the spacer elements to each other to establish the closed annulus in positive disposition on the inner conductor.

9. In a gas insulated high voltage cable having an outer tubular, corrugated conductor and an inner centrally disposed conductor, a spacer construction for holding and spacing the inner conductor in the tubular outer conductor, comprising:
   two spacer elements of semi-annular construction, each with azimuthally directed end faces and complementing each other for establishing a closed annulus when the end faces are placed in abutment, each element having a foot portion for engagement with the inner conductor and a head portion for engagement with the outer conductor;

a metal insert disposed in the foot portion of each spacer element adjacent the inner conductor, the inserts each having curved ends facing each other across the end faces of each elements when disposed for establishing the closed annulus, to provide electrical tension relief in the joint as established between these end faces where in abutment; and means for securing the spacer elements to each other to establish the closed annulus in positive disposition on the inner conductor.

10. A spacer construction as in claim 9, the inserts being kidney shaped conductive inserts in the foot portion together extending around most of the periphery of the inner conductor.

11. In a gas insulated high voltage cable having an outer tubular, corrugated conductor and an inner centrally disposed conductor, a spacer construction for holding and spacing the inner conductor in the tubular outer conductor, comprising:

two spacer elements of semi-annular construction, each with azimuthally directed end faces and complementing each other for establishing a closed annulus when the end faces are placed in abutment, each element having a foot portion for engagement with the inner conductor and a head portion for engagement with the outer conductor, the head portion of each element having a peripheral surface facing the outer conductor and provided with axially extending grooves adjacent to and facing the outer conductor;

a plurality of resilient elements respectively disposed in said grooves for engagement with inwardly extending ridges of the corrugation of the outer conductors, there being a narrow passage for gas between the surface of the head portion outside of the grooves and the corrugation ridge as engaging the resilient elements; and means for securing the spacer elements to each other to establish the closed annulus in positive disposition on the inner conductor.

12. In a gas insulated high voltage cable having an outer tubular corrugated conductor and an inner centrally disposed conductor, a spacer construction for holding and spacing the inner conductor in the tubular outer conductor, comprising:

two spacer elements of semi-annular construction, each with azimuthally directed end faces and complementing each other for establishing a closed annulus when the end faces are placed in abutment, each element having a foot portion for engagement with the inner conductor and a head portion for engagement with the outer conductor;

and means including a wedge clamp engaging two ridges respectively on the two elements at two of said end faces, one end face each per element, for securing the spacer elements to each other to establish the annulus, the wedge clamp being axially displaceable on the two ridges for determining the width of gap between the said two end faces.

13. In a gas insulated high voltage cable having an outer tubular, corrugated conductor and an inner centrally disposed conductor, a spacer construction for holding and spacing the inner conductor in the tubular conductor, comprising:

two spacer elements of semi-annular construction, each with azimuthally directed end faces and complementing each other for establishing a closed annulus when the end faces are placed in abutment, each element having a foot portion for engagement with the inner conductor and a head portion for engagement with the outer conductor;

releasable interengaging hinge parts respectively at the two spacer elements and adjacent one end face each and at the respective head portion, for hinging one of the elements to the other;

interlocking parts respectively at and extending from the head portion of the elements at the other end faces with saw-tooth shaped serrations for interlocking the two parts when the elements are hinged, thereby establishing a closed annulus in positive disposition on the inner conductor; and resilient means at the outer surface of the head portion in resilient engagement with the outer conductor independent from the corrugation thereof.

14. In a cable as in claim 13, wherein the resilient means are individual, tangentially extending tongues, which are being radially deflected upon resilient engagement with the outer conductor.

* * * * *